(12) United States Patent
Lung et al.

(10) Patent No.: US 10,411,478 B2
(45) Date of Patent: Sep. 10, 2019

(54) GRID CONNECTION POWER CONVERSION DEVICE AND DISCONNECTION/WELDING DETECTION METHOD THEREFOR

(71) Applicant: Tabuchi Electric Co., Ltd., Yodogawa-ku, Osaka (JP)

(72) Inventors: Chienru Lung, Osaka (JP); Hideki Hidaka, Osaka (JP)

(73) Assignee: Tabuchi Electric Co., Ltd., Osaka (JP)

( * ) Notice: Subject to any disclaimer, the term of this patent is extended or adjusted under 35 U.S.C. 154(b) by 237 days.

(21) Appl. No.: 15/401,510

(22) Filed: Jan. 9, 2017

(65) Prior Publication Data

US 2017/0346294 A1 Nov. 30, 2017

(30) Foreign Application Priority Data

May 27, 2016 (JP) ................. 2016-106031

(51) Int. Cl.
*H02J 3/38* (2006.01)
*H02J 7/00* (2006.01)
(Continued)

(52) U.S. Cl.
CPC ............ *H02J 3/385* (2013.01); *H02J 7/0052* (2013.01); *H02J 7/0068* (2013.01); *H02J 9/06* (2013.01);
(Continued)

(58) Field of Classification Search
CPC .......... H02J 3/385; H02J 3/386; H02J 7/0052; H02J 7/0068; H02M 1/32; H02M 1/36; H02M 3/04; H02M 7/537; H02M 7/5387
See application file for complete search history.

(56) References Cited

U.S. PATENT DOCUMENTS

| 5,977,659 A * | 11/1999 | Takehara | ................ | H02J 3/383 |
| | | | | 307/126 |
| 2011/0140520 A1* | 6/2011 | Lee | ................... | H01L 31/02021 |
| | | | | 307/25 |

(Continued)

FOREIGN PATENT DOCUMENTS

| JP | 2014-64415 A | 4/2014 |
| JP | 2015-27146 A | 2/2015 |

*Primary Examiner* — Jared Fureman
*Assistant Examiner* — Emmanuel Dominique
(74) *Attorney, Agent, or Firm* — Crowell & Moring LLP

(57) ABSTRACT

A grid connection power conversion device having isolated operation function for connecting a distributed power supply to a commercial power system is provided which comprises an inverter for converting DC power to AC power, a capacitor connected between the inverter and the commercial power system, a commercial voltage amplitude detection circuitry, an amplitude adjustment circuitry to increase an amplitude of an output voltage from the inverter stepwise from a given value to match the amplitude of the commercial system voltage, and a start-up control circuitry to control the grid connection power conversion device so that after the amplitude adjustment circuitry adjusts the amplitude of the output voltage from the inverter, after the start-up, to match the amplitude of the commercial system voltage detected by the commercial voltage amplitude detection circuitry, the start-up control circuitry connects the inverter to the commercial power system to start grid-connected operation.

7 Claims, 8 Drawing Sheets

(51) Int. Cl.
  *H02M 1/36* (2007.01)
  *H02M 3/04* (2006.01)
  *H02M 7/537* (2006.01)
  *H02M 1/32* (2007.01)
  *H02M 7/5387* (2007.01)
  *H02J 9/06* (2006.01)
  *H02J 3/40* (2006.01)

(52) U.S. Cl.
  CPC ............... *H02M 1/32* (2013.01); *H02M 1/36* (2013.01); *H02M 3/04* (2013.01); *H02M 7/537* (2013.01); *H02M 7/5387* (2013.01); *H02J 3/386* (2013.01); *H02J 3/40* (2013.01); *H02J 2007/0059* (2013.01)

(56) References Cited

U.S. PATENT DOCUMENTS

| | | | |
|---|---|---|---|
| 2012/0013376 A1* | 1/2012 | Thacker | H03L 7/085 327/156 |
| 2012/0039101 A1* | 2/2012 | Falk | H02J 3/383 363/95 |
| 2012/0310438 A1* | 12/2012 | Kaiser | H02J 3/383 700/298 |
| 2014/0254227 A1* | 9/2014 | Hantschel | H02J 3/383 363/131 |

* cited by examiner

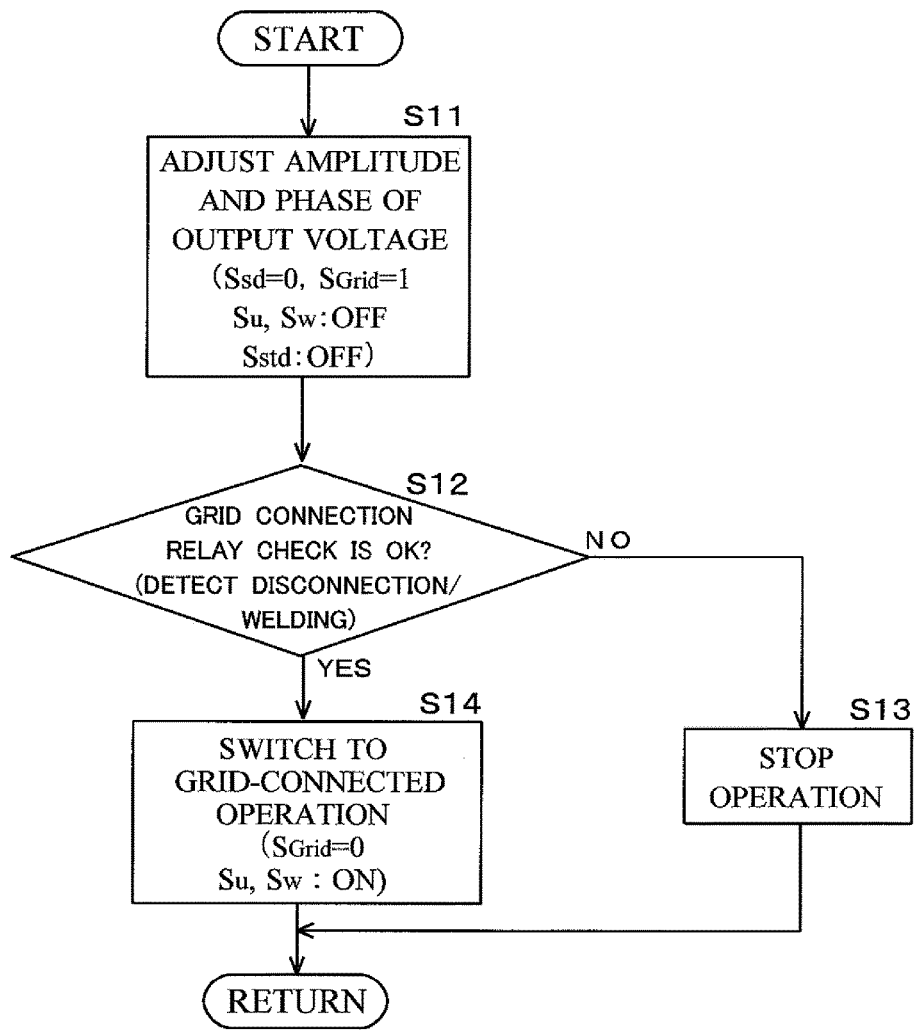

GRID CONNECTION POWER CONVERSION DEVICE AND DISCONNECTION/WELDING DETECTION METHOD THEREFOR

CROSS-REFERENCE TO RELATED APPLICATION

This application is based on and claims the benefit of priority of the prior Japanese Patent Application No. 2016-106031, filed on May 27, 2016, the entire contents of which are incorporated herein by reference.

BACKGROUND OF THE INVENTION

1. Field of the Invention

The present invention relates to a grid connection power conversion device (that is, power conversion device for grid connection) having an isolated operation function which is applicable to a hybrid power generation and storage system, and also relates to a start-up control method for the power conversion device.

2. Description of the Related Art

In recent years, a hybrid power generation and storage system formed by a combination of a solar photovoltaic power generation system and a power storage device has spread over the world to effectively use natural energy from a solar cell. In this field of hybrid power generation and storage system, there is an increasing demand to provide two functions in one power conversion device: a function of grid connection to a commercial power system; and a function to supply power to an isolated power system during power outage.

The hybrid power generation and storage system performs Maximum Power Point Tracking (hereafter referred to as MPPT) control to convert DC power generated by the solar cell to an optimum output power by regulating an input voltage from the solar cell to maximize (optimize) the output voltage from the solar cell. More specifically, the hybrid power generation and storage system comprises: a DC/DC converter for increasing or decreasing the input voltage from the solar cell to a predetermined voltage to increase or decrease the DC output voltage (DC bus voltage $V_{dc}$) within a certain range; a power storage device for storing power output from the solar cell to effectively use natural energy from the solar cell; a bidirectional DC/DC converter for controlling to charge and discharge power to and from the power storage device according to a power command; and an inverter for converting the DC power output from these DC/DC converters to AC power.

The inverter comprises switching elements such as IGBTs (Insulated Gate Bipolar Transistors) which are switched by a PWM (Pulse Width Modulation) signal sent from a control unit of the hybrid power generation and storage system. In order to remove the carrier of the PWM signal, the hybrid power generation and storage system comprises an LC (inductor-capacitor) filter for removing high frequency components, which is provided between the inverter and the commercial power system. When the inverter of the hybrid power generation and storage system is connected to the commercial power system at start-up of the hybrid power generation and storage system, the voltage applied to the capacitor of the LC filter abruptly increases from 0V to the commercial system voltage. Therefore, an inrush current may flow in the capacitor to cause a contact of a grid connection relay to be welded, and it is considered that other circuitry elements (such as the switching elements of the inverter) in the hybrid power generation and storage system may be broken.

Thus, in order to reduce an inrush current to the capacitor, a power conversion device is known which has an inrush current prevention circuitry formed by a parallel circuitry of a switch and a resistor and connected in series to the capacitor, and which is designed to detect a failure of the switch in the inrush current prevention circuitry, as described in Japanese Laid-open Patent Publication 2015-027146. Further, in this kind of power conversion device, as described in Japanese Laid-open Patent Publication 2014-064415, it is known to output a control signal to a relay (second switch 16) for isolated power system to bring the relay to an open state, and also output a test voltage V3 from an inverter (power conversion unit 13) so as to detect welding of a contact of the relay for isolated power system (welding between internal terminals of the second switch 16) based on a voltage value of a terminal for isolated operation as then detected by a voltage detection unit of the isolated power system.

However, these power conversion devices have the following problems. In the power conversion device described in Japanese Laid-open Patent Publication 2015-027146, it is necessary to newly provide an inrush current prevention circuitry formed by a parallel switch and a resistor and the like, and therefore the manufacturing cost of the power conversion device increases. Further, in the power conversion device described in Japanese Laid-open Patent Publication 2014-064415, it is possible to detect welding of a contact of a relay for isolated power system, but it is not possible to reduce an inrush current to the capacitor of the LC filter (provided between the inverter and the commercial power system).

BRIEF SUMMARY OF THE INVENTION

An object of the present invention is to solve the problems described above, and to provide a grid connection power conversion device having an isolated operation function and a start-up control method for the grid connection power conversion device which make it possible to reduce an inrush current to a capacitor connected between an inverter and a commercial power system at start-up of the power conversion device without using an inrush current prevention circuitry.

According to a first aspect of the present invention, this object is achieved by a grid connection power conversion device having isolated operation function which is provided for connecting a distributed power supply, whose output power is stored in a power storage device, to a commercial power system, the grid connection power conversion device comprising: an inverter for converting DC power based on power input from at least one of the distributed power supply and the power storage device to AC power; a capacitor connected between the inverter and the commercial power system; a commercial voltage amplitude detection circuitry configured to detect an amplitude of a commercial system voltage which is a voltage of the commercial power system; an amplitude adjustment circuitry configured to increase an amplitude of an output voltage from the inverter stepwise from a given value to adjust the amplitude of the output voltage from the inverter to match the amplitude of the commercial system voltage detected by the commercial voltage amplitude detection circuitry; and a start-up control circuitry configured to control the grid connection power conversion device so that after the amplitude adjustment circuitry adjusts the amplitude of the output voltage from the inverter, after the start-up of the grid connection power conversion device, to match the amplitude of the commercial system voltage detected by the commercial voltage amplitude detection circuitry, the start-up control circuitry connects the inverter to the commercial power system to start grid-connected operation.

According to the present invention, the amplitude of the output voltage from the inverter is increased stepwise from a given value, after start-up of the power conversion device, to adjust the amplitude of the output voltage from the inverter to match the amplitude of the commercial system voltage as detected, and thereafter the inverter is connected to the commercial power system to start grid-connected operation. This makes it possible to prevent the voltage applied to a capacitor connected between the inverter and the commercial power system from abruptly increasing from 0V to the commercial system voltage at the start-up of the power conversion device, thereby making it possible to reduce an inrush current to the capacitor at the start-up without using an inrush current prevention circuitry.

It is preferred that the grid connection power conversion device further comprises: a commercial voltage phase angle detection circuitry configured to detect a phase angle of the commercial system voltage; and a phase angle adjustment circuitry configured to adjust a phase angle of the output voltage from the inverter to allow a phase difference between the phase angle of the output voltage from the inverter and the phase angle of the commercial system voltage detected by the commercial voltage phase angle detection circuitry to have a value within a predetermined range, wherein the start-up control circuitry controls the grid connection power conversion device so that after the phase angle adjustment circuitry adjusts the phase angle of the output voltage from the inverter, after the start-up of the grid connection power conversion device, so as to allow the phase difference to have a value within a predetermined range, the start-up control circuitry connects the inverter to the commercial power system to start the grid-connected operation.

In the grid connection power conversion device, it is preferred that the phase angle adjustment circuitry adjusts the phase angle of the output voltage from the inverter to allow the phase difference to have a certain value, therein the grid connection power conversion device further comprises: a grid connection switch for switching the connection of the distributed power supply to the commercial power system between a connected state and a disconnected state; an output voltage phase angle detection circuitry configured to detect the phase angle of the output voltage from the inverter; and a disconnection/welding detection circuitry configured to detect disconnection of the grid connection switch, before starting the grid-connected operation, based on the phase difference as detected between the phase angle detected by the output voltage phase angle detection circuitry and the phase angle detected by the commercial voltage phase angle detection circuitry when switching the grid connection switch to the connected state, and also configured to detect welding of the grid connection switch, before starting the grid-connected operation, based on the phase difference as detected when switching the grid connection switch to the disconnected state.

The grid connection power conversion device can be designed so that the start-up control circuitry performs an isolated operation control immediately after the start-up of the grid connection power conversion device, therein in the isolated operation control, the amplitude adjustment circuitry adjusts the amplitude of the output voltage from the inverter to match the amplitude of the commercial system voltage detected by the commercial voltage amplitude detection circuitry.

In the grid connection power conversion device, it is preferred that the amplitude adjustment circuitry increases the amplitude of the output voltage from the inverter stepwise from an isolated system voltage output from the grid connection power conversion device in the isolated operation or from 0 to adjust the amplitude of the output voltage from the inverter to match the amplitude of the commercial system voltage detected by the commercial voltage amplitude detection circuitry.

In the grid connection power conversion device, it is preferred that each of the commercial voltage phase angle detection circuitry and the output voltage phase angle detection circuitry is a PLL circuitry.

According to a second aspect of the present invention, the above object is achieved by a start-up control method for a grid connection power conversion device having isolated operation function which is provided for connecting a distributed power supply, whose output power is stored in a power storage device, to a commercial power system, and which comprises: an inverter for converting DC power based on power input from at least one of the distributed power supply and the power storage device to AC power; and a capacitor connected between the inverter and the commercial power system, the start-up control method comprising the steps of: increasing an amplitude of an output voltage from the inverter stepwise from a given value, after start-up of the grid connection power conversion device, to adjust the amplitude of the output voltage from the inverter to match an amplitude of a commercial system voltage; and thereafter connecting the inverter to the commercial power system to start grid-connected operation.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein:

FIG. 4A is a schematic block diagram showing an outline of the PLL circuitry of FIG. 1, while

FIG. 8 is a flow chart of a control process of a hybrid power generation and storage system according to Modified Example 1 of the present invention at its start-up.

DETAILED DESCRIPTION OF THE INVENTION

Figure 1:
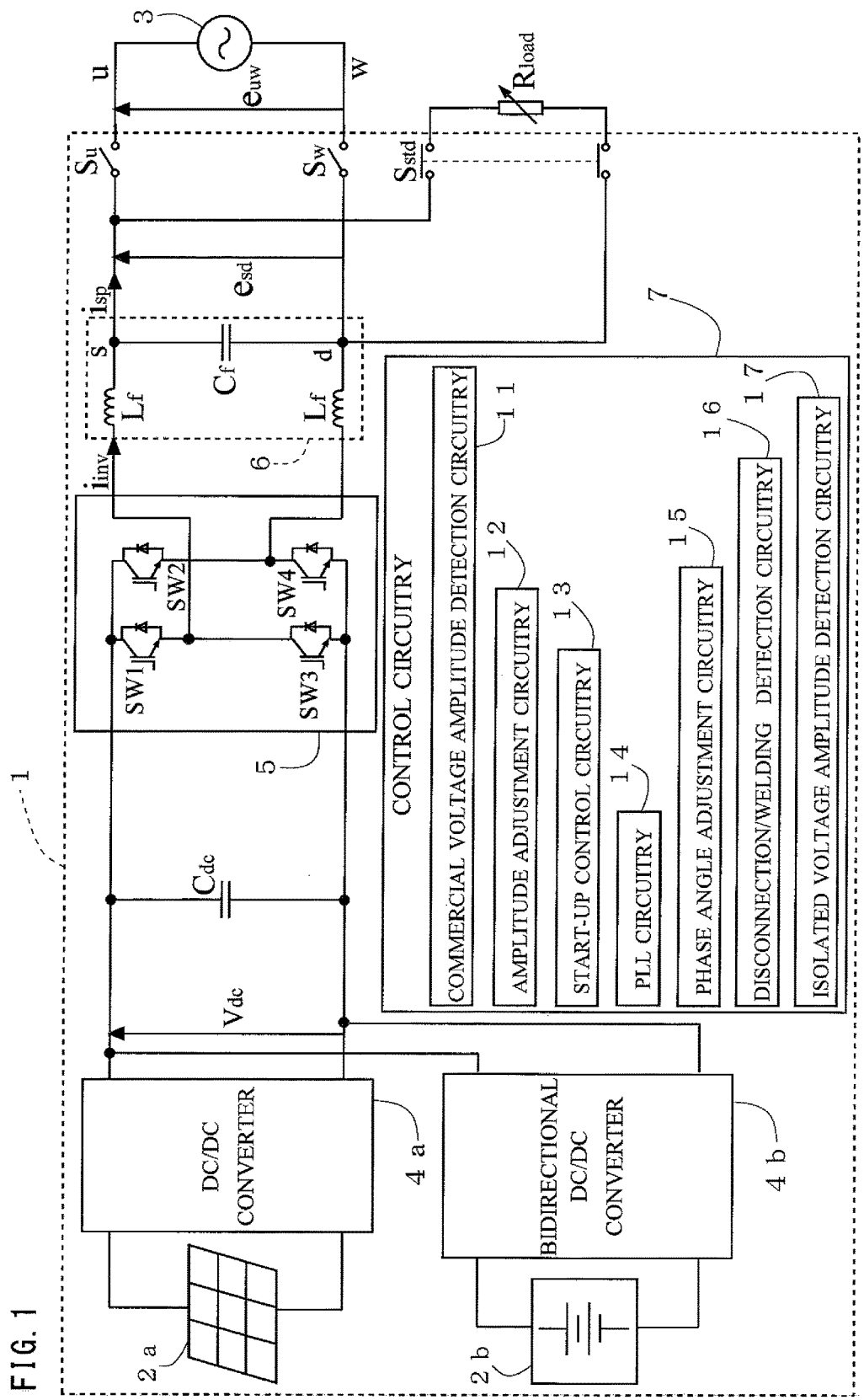
FIG. 1 is a schematic circuit diagram, partially in block form, showing an outline of a hybrid power generation and storage system according to an exemplary embodiment of the present invention.

Hereinafter, a grid connection power conversion device and a start-up control method for the grid connection power conversion device according to an exemplary embodiment of the present invention will be described with reference to the drawings. The present embodiment shows an example where the claimed grid connection power conversion device is a hybrid power generation and storage system formed by a combination of a solar photovoltaic power generation system and a power storage device. FIG. 1 is a schematic circuit diagram, partially in block form, showing an outline of a hybrid power generation and storage system 1 according to the exemplary embodiment. The hybrid power generation and storage system 1 is a combination of a so-called power conditioner with a solar photovoltaic cell 2a as a distributed power supply and a power storage device 2b to store power output from the solar cell 2a, in which the solar cell 2a can be connected (grid-connected) to a commercial power system (commercial power grid) 3. The hybrid power generation and storage system 1 has an isolated operation function to supply AC power to a specific load device $R_{load}$ during power outage.

The hybrid power generation and storage system 1 comprises: a DC/DC converter 4a for converting DC power generated by the solar cell 2a to an optimum output power; a bidirectional DC/DC converter 4b which can charge and discharge power to and from the power storage device 2b according to a power command to maximize the use of natural energy; and a DC/AC inverter 5 (hereafter referred to simply as "inverter 5") for converting DC power output from the DC/DC converters 4a and 4b (that is, DC power based on power input from at least one of the solar cell 2a and the power storage device 2b) to AC power. The hybrid power generation and storage system 1 further comprises an electrolytic capacitor $C_{dc}$ for smoothing DC bus voltage, an LC (inductor-capacitor) filter 6, a control circuitry 7, grid connection relays (that is, relays for grid connection) $S_u$ and $S_w$ (claimed "grid connection switch") and an isolated power system relay (that is, relay for isolated power system) $S_{std}$.

The DC/DC converter 4a performs Maximum Power Point Tracking (hereafter referred to as MPPT) control of the solar cell 2a to adjust an input voltage from the solar cell 2a to maximize (optimize) an output power from the solar cell 2a. More specifically, the DC/DC converter 4a increases or decreases the input voltage from the solar cell 2a to a predetermined voltage to increase or decrease the DC output voltage (DC bus voltage $V_{dc}$) within a certain range. On the other hand, the bidirectional DC/DC converter 4b controls, according to a power command, to charge and discharge power to and from the power storage device 2b to maximize the use of natural energy. More specifically, the bidirectional DC/DC converter 4b controls to charge and discharge power to and from the power storage device 2b based on information such as the amount of excess power and the amount of purchased power in the power supplied from the solar cell 2a. Thereafter, by using the inverter 5, the hybrid power generation and storage system 1 converts the DC output power from the DC/DC converter 4a and the bidirectional DC/DC converter 4b to AC power. Note that when the hybrid power generation and storage system 1 performs an isolated operation control, the DC/DC converter 4a always performs the MPPT control to always maximize the output (generated) power from the solar cell 2a, while the power storage device 2b controls the bidirectional DC/DC converter 4b to maintain the DC bus voltage $V_{dc}$ constant.

The inverter 5 comprises switching elements SW1 to SW4 formed by IGBTs (Insulated Gate Bipolar Transistors) which are switched by a PWM (Pulse Width Modulation) signal sent from a control unit of the hybrid power generation and storage system 1. The LC filter 6 comprises two inductive reactors $L_f$ each connected in series with each of two power supply lines, and a capacitor $C_f$ connected between the two power supply lines to remove harmonic (high frequency) components (mainly the carrier frequency of the PWM signal) from the AC voltage output from the inverter 5. The capacitor $C_f$ of the LC filter 6 corresponds to the claimed "capacitor connected between the inverter and the commercial power system".

The control circuitry 7 is formed by a so-called microcomputer, and comprises circuitries including a commercial voltage amplitude detection circuitry 11, an amplitude adjustment circuitry 12, a start-up control circuitry 13, a PLL (Phase Locked Loop) circuitry (synchronous circuitry) 14, a phase angle adjustment circuitry 15, a disconnection/welding detection circuitry 16 and an isolated voltage amplitude detection circuitry 17. These circuitries 11 to 17 are formed by basic function blocks of the microcomputer. As will be described in detail later in the description of FIGS. 4A and 4B, the PLL circuitry 14 comprises a PLL circuitry 14a (claimed "output voltage phase angle detection circuitry") configured to detect a phase angle of an isolated system voltage (that is, an output voltage from the inverter 5) and a PLL circuitry 14b (claimed "commercial voltage phase angle detection circuitry") configured to detect a phase angle of a commercial system voltage which is a voltage of the commercial power system.

The commercial voltage amplitude detection circuitry 11 of the control circuitry 7 is configured to detect an amplitude of a commercial system voltage $e_{uw}$. The amplitude adjustment circuitry 12 is configured to increase an amplitude of an output voltage from the inverter 5 stepwise from a given value, or more specifically from an amplitude of an isolated system voltage $e_{sd}$, to adjust the amplitude of the output voltage from the inverter 5 to match the amplitude of the commercial system voltage $e_{uw}$ detected by the commercial voltage amplitude detection circuitry 11. The start-up control circuitry 13 is configured to control the hybrid power generation and storage system 1 so that after the amplitude adjustment circuitry 12 adjusts the amplitude of the output voltage from the inverter 5, after the start-up of the hybrid power generation and storage system 1, to match the amplitude of the commercial system voltage $e_{uw}$ detected by the commercial voltage amplitude detection circuitry 11, the start-up control circuitry 13 connects the inverter 5 to the commercial power system 3 so as to allow the hybrid power generation and storage system 1 to smoothly shift to grid-connected operation control (that is, to smoothly start grid-connected operation).

The PLL circuitry 14 is configured to output a signal synchronized with a reference input signal, and is mainly used to generate a voltage signal synchronized with a phase angle $\theta_{uw}$ of the commercial system voltage $e_{uw}$. This PLL circuitry 14 is also used to detect the phase angle $\theta_{uw}$, of the commercial system voltage $e_{uw}$ as well as the phase angle of the output voltage from the inverter 5 at start-up of the hybrid power generation and storage system 1 as will be described later. The phase angle adjustment circuitry 15 is configured to adjust a phase angle of the output voltage from the inverter 5 after (immediately after) the start-up of the hybrid power generation and storage system 1 to allow a phase difference between the phase angle of the output voltage from the inverter 5 (isolated system voltage $e_{sd}$) and the phase angle of the commercial system voltage $e_{uw}$ detected by the PLL circuitry 14 to have a certain value. The disconnection/welding detection circuitry 16 is configured to detect disconnection and welding of the grid connection relays $S_u$ and $S_w$. The detection process performed by the disconnection/welding detection circuitry 16 will be described in detail later. The isolated voltage amplitude detection circuitry 17 detects an amplitude of the output voltage from the inverter 5 (isolated system voltage $e_{sd}$).

The grid connection relays $S_u$ and $S_w$ (claimed "grid connection switch") serve as a switch for switching the connection of the hybrid power generation and storage system 1, particularly its solar cell 2a as a distributed power supply, to the commercial power system 3 between a connected state and a disconnected state. In FIG. 1, $i_{inv}$ and $i_{sp}$ respectively represent an output current from the inverter 5 and a reverse power flow current from the hybrid power generation and storage system 1 to the commercial power system 3. Further, $R_{load}$ represents a specific load device (hereafter referred to as isolated load) to which the hybrid power generation and storage system 1 supplies power when performing an isolated operation.

Figure 2:
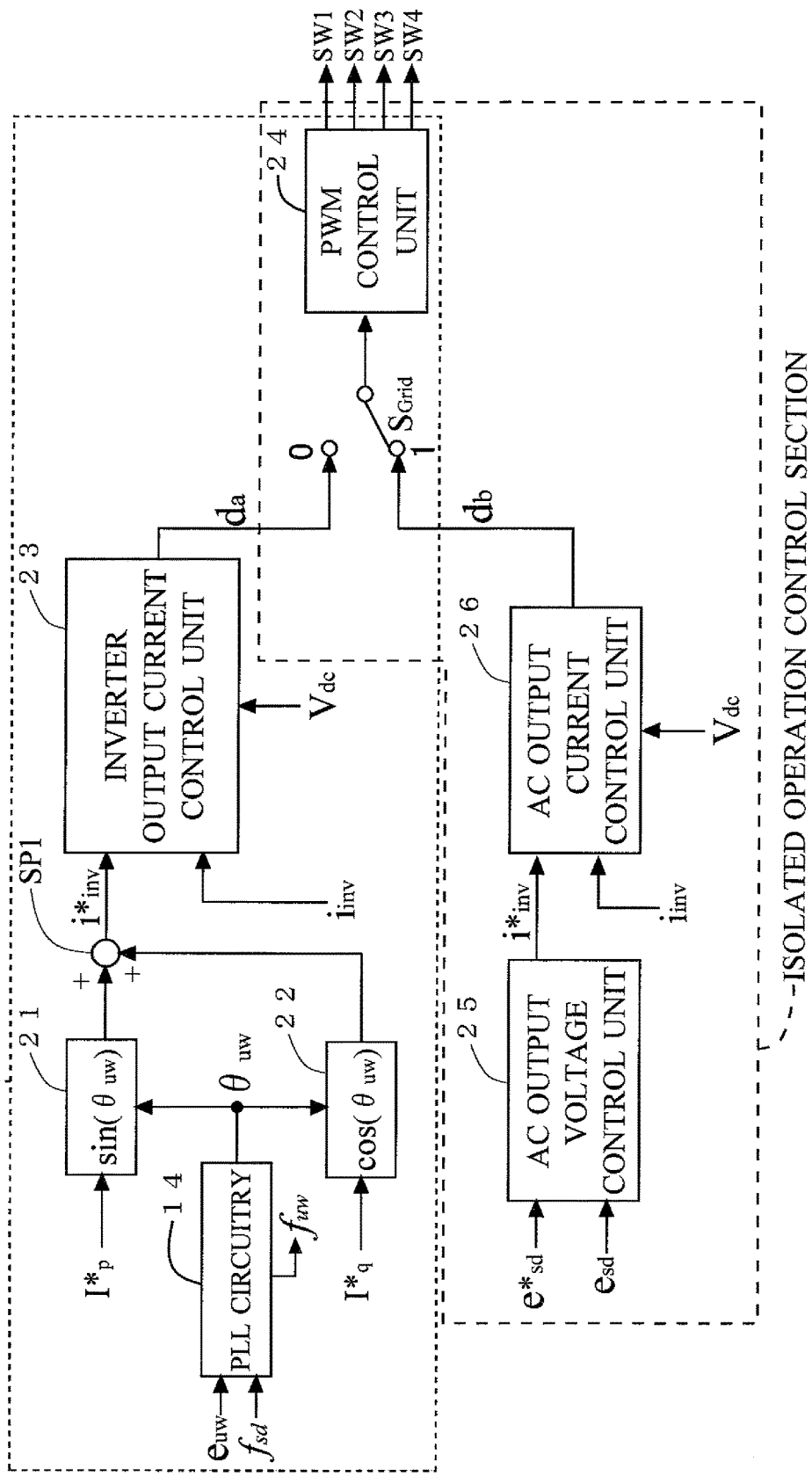
FIG. 2 is a schematic block diagram showing an outline of control of a control circuitry to control a DC/AC inverter in the hybrid power generation and storage system.

FIG. 2 is a schematic block diagram showing an outline of control of the control circuitry 7 in the hybrid power generation and storage system 1. FIG. 2 shows a grid-connected operation control section and an isolated operation control section. The control circuitry 7 of the hybrid power generation and storage system 1 performs a grid-connected operation control when a switch $S_{Grid}$ is in position 0, and performs an isolated operation control when the switch $S_{Grid}$ is in position 1. Further, in the grid-connected operation, the control circuitry 7 performs an output current control for active and reactive components. On the other hand, in the isolated operation, the control circuitry 7 controls an AC output voltage to be constant.

As shown in FIG. 2, the grid-connected operation control section comprises an active component generation unit 21, a reactive component generation unit 22, an inverter output current control unit 23 and a PWM control unit 24. The active component generation unit 21 multiplies an output current command value $I^*_p$ for the active component by a sine value $\sin(\theta_{\mu w})$ of the phase angle $\theta_{uw}$ of the commercial system voltage $e_{uw}$ output from the PLL circuitry 14 to generate an instantaneous output value of the output current command value $I^*_p$ for the active component.

On the other hand, the reactive component generation unit 22 multiplies an output current command value $I^*_q$ for the reactive component by a cosine value $\cos(\theta_{\mu w})$ of the phase angle $\theta_{uw}$ of the commercial system voltage output from the PLL circuitry 14 to generate an instantaneous output value of the output current command value $I^*_p$ for the reactive component. Note that as shown in FIG. 2, the PLL circuitry 14 receives an input of an isolated system frequency $f_{sd}$ which corresponds to the fundamental frequency required in a conventional PLL circuitry, while a commercial system frequency $f_{uw}$ is obtained from the PLL circuitry 14. In other words, even if the actual commercial system frequency is different from the isolated system frequency, the correct commercial system frequency $f_{uw}$ can be detected by using the PLL circuitry 14.

The instantaneous output value from the active component generation unit 21 and the instantaneous output value from the reactive component generation unit 22 are summed at a summing point SP1 to produce an output current command value $i^*_{inv}$ for the inverter 5. The output current command value $i^*_{inv}$ and an output current $i_{inv}$ from the inverter 5 as a feedback value are sent to the inverter output current control unit 23. The inverter output current control unit 23 performs a feedback control such that the value of the output current $i_{inv}$ from the inverter 5 follows the output current command value $i^*_{inv}$, so as to calculate a duty ratio $d_a$ of PWM control for the grid-connected operation. The duty ratio $d_a$ is input to the PWM control unit 24. Based on the input duty ratio $d_a$, the PWM control unit 24 generates a PWM signal having a pulse width corresponding to the duty ratio $d_a$. This PWM signal is used to control the on/off of each of the switches SW1, SW2, SW3 and SW4 of the inverter 5 (refer to FIG. 1).

Referring again to FIG. 2, the isolated operation control section comprises an AC output voltage control unit 25 and an AC output current control unit 26 in addition to the PWM control unit 24. When the switch $S_{Grid}$ is in position 1, the control circuitry 7 performs the isolated operation control. More specifically, the AC output voltage control unit 25 receives an input of an isolated system voltage command value $e^*_{sd}$ and an isolated system voltage $e_{sd}$ as a feedback value to calculate an AC output current command value $i^*_{inv}$ for controlling the AC output voltage to be constant. Thereafter, the AC output current command value $i^*_{inv}$ and an output current $i_{inv}$ as a feedback value are input to and used by the AC output current control unit 26 to calculate a duty ratio $d_b$ of PWM control for the isolated operation.

Based on the duty ratio $d_b$ calculated by the AC output current control unit 26, the PWM control unit 24 generates a PWM signal having a pulse width corresponding to the duty ratio $d_b$. This PWM signal is used to control the on/off of each of the switches SW1, SW2, SW3 and SW4 of the inverter 5. Thus, the isolated system voltage $e_{sd}$ to be output from the inverter 5 in the isolated operation is maintained substantially at the isolated system voltage command value $e^*_{sd}$.

The hybrid power generation and storage system 1 of the present exemplary embodiment uses a start-up control method such that the hybrid power generation and storage system 1 (mainly the start-up control circuitry 13) performs the isolated operation control, before shifting to the grid-connected operation, to prevent or reduce an inrush current to a capacitor $C_f$ on the output side of the inverter 5 at its start-up, and that the hybrid power generation and storage system 1 (mainly the amplitude adjustment circuitry 12) adjusts the amplitude of the output voltage from the inverter 5 to match the amplitude of the commercial system voltage in the isolated operation control, and thereafter shifts to the grid-connected operation control as shown in FIG. 2.

Figure 3:
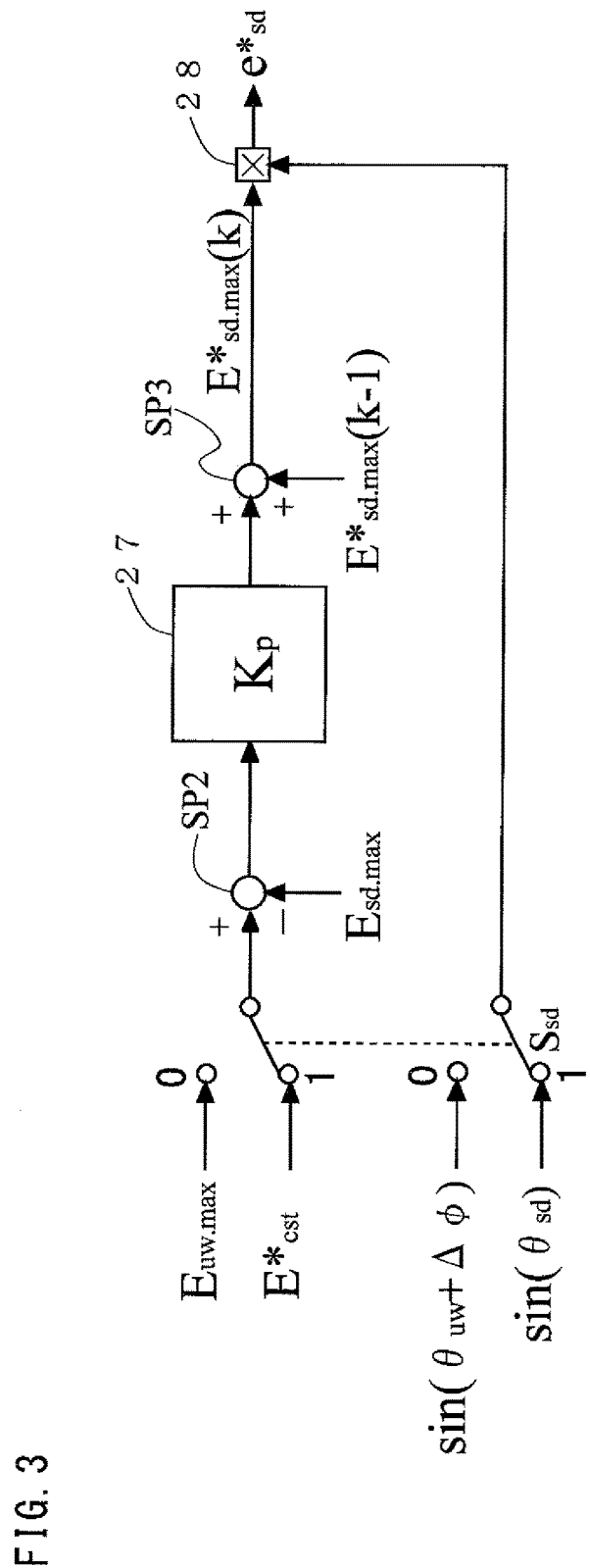
FIG. 3 is a schematic block diagram showing an amplitude and phase adjustment control of an output voltage from the inverter, which the hybrid power generation and storage system performs in an isolated operation control after (immediately after) its start-up.

FIG. 3 is a schematic block diagram showing an amplitude and phase adjustment control block of an output voltage from the inverter 5 (isolated system voltage $e_{sd}$), which is performed by the control circuitry 7 (mainly the amplitude adjustment circuitry 12) in an isolated operation control after (immediately after) start-up of the hybrid power generation and storage system 1. When a switch $S_{sd}$ is in position 1 (more specifically, when the switch $S_{sd}$ is set by the control circuitry 7 in position 1), the control circuitry 7 controls to adjust a maximum value $E_{sd.max}$ (amplitude) of the isolated system voltage $e_{sd}$ to match a command value $E^*_{cst}$ of the maximum value $E_{sd.max}$ of the isolated system voltage $e_{sd}$. On the other hand, when the switch $S_{sd}$ is in position 0, the control circuitry 7 controls to adjust the maximum value $E_{sd.max}$ (amplitude) of the isolated system voltage $e_{sd}$ to match a maximum value $E_{uw.max}$ of the commercial system voltage $e_{uw}$ (amplitude of the commercial system voltage).

In FIG. 3, $E_{uw.max}$ is the maximum value (amplitude) of the commercial system voltage $e_{uw}$, while $E_{sd.max}$ is the maximum value (amplitude) of the isolated system voltage $e_{sd}$ (and can be expressed as $E_{sd.max}(k)$ as well and may hereafter be referred to as current (present) maximum value $E_{sd.max}$), and $E^*_{sd.max}(k-1)$ is a command value of the maximum value $E_{sd.max}$ of the isolated system voltage $e_{sd}$ in a sampling period preceding (immediately preceding) the k-th sampling period. Further, $\theta_{sd}$ is the phase angle of the isolated system voltage $e_{sd}$ when the isolated operation is normally performed, while $\theta_{uw}$ is the phase angle of the commercial system voltage $e_{uw}$, and $\Delta\varphi$ is a threshold of the phase angle which is newly introduced to provide a difference between the phase angle $\theta_{sd}$ of the isolated system voltage $e_{sd}$ and the phase angle $\theta_{uw}$ of the commercial system voltage $e_{uw}$. Note that (k) represents a value in the k-th sampling period which means the current (present) value, while (k−1) represents a value in the sampling period preceding the k-th sampling period, that is, a value preceding the current value. Also note that the sampling period in the present exemplary embodiment is an inverse of a switching frequency.

When the switch $S_{sd}$ is in position 1, the control circuitry 7 (mainly the amplitude adjustment circuitry 12) of the hybrid power generation and storage system 1 subtracts, at a summing point SP2, the maximum value $E_{sd.max}$ (current (present) maximum value which can be expressed as $E_{sd.max}(k)$ as well) of the isolated system voltage $e_{sd}$ in a specific sampling period (k-th or current sampling period) from the command value $E^*_{cst}$ of the maximum value $E_{sd.max}$ of the isolated system voltage $e_{sd}$ in the same specific sampling period to obtain a difference value between the two values. The control circuitry 7 comprises a proportional control unit ($K_p$) 27 which multiplies the difference value by a proportional gain $K_p$ to output an output value (product of the multiplication) to a summing point SP3. Here, a positive value (such as 0.01) which is much lower than 1 is used as the proportional gain $K_p$.

The output value from the proportional control unit 27 is summed at the summing point SP3 with the command value $E^*_{sd.max}(k-1)$ of the maximum value $E_{sd.max}$ of the isolated system voltage $e_{sd}$ in the (k−1)th sampling period (such a command value $E^*_{sd.max}(k-1)$ may hereafter be referred to as preceding command value $E^*_{sd.max}(k-1)$ as well) preceding the specific sampling period (k-th or current sampling period) so as to produce a command value $E^*_{sd.max}(k)$ of the maximum value $E_{sd.max}$ of the isolated system voltage $e_{sd}$ as the current command value $E^*_{sd.max}(k)$. The thus produced current command value $E^*_{sd.max}(k)$ is sent to a multiplier 28 of the control circuitry 7. The multiplier 28 multiplies the command value $E^*_{sd.max}(k)$ sent from the summing point SP3 by a sine value $\sin(\theta_{sd})$ corresponding to the phase angle $\theta_{sd}$ of the isolated system voltage $e_{sd}$ as obtained by the PLL circuitry 14 (more specifically, PLL circuitry 14a shown in FIG. 4A later) so as to calculate an isolated system voltage command value $e^*_{sd}$.

The use of a positive value (such as 0.01) much lower than 1 as the proportional gain $K_p$ as described above can increase the preceding command value $E^*_{sd.max}(k-1)$ of the maximum value $E_{sd.max}$ of the isolated system voltage $e_{sd}$ step-wise by repeating the summation, making it possible to adjust the maximum value $E_{sd.max}$ (amplitude) of the isolated system voltage $e_{sd}$ to gradually match or follow the command value $E^*_{cst}$ of the maximum value $E_{sd.max}$ of the isolated system voltage $e_{sd}$. When performing an isolated operation immediately after its start-up, the hybrid power generation and storage system 1 sets, to 0, both the initial value of the maximum value $E_{sd.max}$ of the isolated system voltage $e_{sd}$ and the initial value of the preceding command value $E^*_{sd.max}(k-1)$ of the maximum value $E_{sd.max}$ of the isolated system voltage $e_{sd}$.

By using such a method of setting both the initial values of $E_{sd.max}$ and $E^*_{sd.max}(k-1)$ to 0 and then stepwise adjusting the maximum value (amplitude) $E_{sd.max}$ of the isolated system voltage $e_{sd}$ to gradually match the command value $E^*_{cst}$ of the amplitude (maximum value $E_{sd.max}$) of the isolated system voltage $e_{sd}$ as described above, a soft start effect (to start the operation or control with a soft start) at start-up of the hybrid power generation and storage system 1 can be obtained. Also, it is considered that the hybrid power generation and storage system 1 has an effect that when supplying power to the isolated load, the hybrid power generation and storage system 1 can adjust the amplitude of the isolated system voltage command value $e^*_{sd}$ so that such amplitude does not exceed the amplitude (maximum value $E_{sd.max}$) of the isolated system voltage $e_{sd}$ due to an abrupt change in the load.

After adjusting the maximum value (amplitude) $E_{sd.max}$ of the isolated system voltage $e_{sd}$ to match the command value $E^*_{cst}$ of the maximum value $E_{sd.max}$ of the isolated system voltage $e_{sd}$ as described above in the isolated operation immediately after its start-up, the control circuitry 7 of the hybrid power generation and storage system 1 switches the switch $S_{sd}$ to position 0 to adjust the maximum value $E_{sd.max}$ (amplitude) of the isolated system voltage $e_{sd}$ to match the maximum value $E_{uw.max}$ (amplitude) of the commercial system voltage $e_{uw}$. In other words, the amplitude of the output voltage from the inverter 5 (isolated system voltage $e_{sd}$) is adjusted to match the amplitude of the commercial system voltage $e_{uw}$.

Next, a process to adjust the amplitude of the output voltage from the inverter 5 to match the amplitude of the commercial system voltage will be described in detail. When the switch $S_{sd}$ is in position 0, the control circuitry 7 (mainly the amplitude adjustment circuitry 12) of the hybrid power generation and storage system 1 subtracts, at the summing point SP2, the maximum value $E_{sd.max}$ (current (present) maximum value which can be expressed as $E_{sd.max}(k)$ as well) of the isolated system voltage $e_{sd}$ in a specific sampling period (k-th or current sampling period) from the maximum value (amplitude) $E_{uw.max}$ of the commercial system voltage $e_{uw}$ (as detected by the commercial voltage amplitude detection circuitry 11) in the same specific sampling period to obtain a difference value between the two maximum values. The proportional control unit 27 of the control circuitry 7 multiplies the difference value by a proportional gain $K_p$ to output an output value (product of the multiplication) to the summing point SP3. Here, similarly as when the switch $S_{sd}$ is position 1, a positive value (such as 0.01) which is much lower than 1 is used as the proportional gain $K_p$.

The output value from the proportional control unit 27 is summed at the summing point SP3 with the preceding command value $E^*_{sd.max}(k-1)$ of the maximum value $E_{sd.max}$ of the isolated system voltage $e_{sd}$ so as to produce a current command value $E^*_{sd.max}(k)$ of the maximum value $E_{sd.max}$ of the isolated system voltage $e_{sd}$. The thus produced current command value $E^*_{sd.max}(k)$ is sent to the multiplier 28 of the control circuitry 7. The multiplier 28 multiplies the current command value E*$_{sd.max}$(k) sent from the summing point SP3 by a sine value of ($\theta_{uw}$+Δθ), sin($\theta_{uw}$+Δθ), to calculate an isolated system voltage command value e*$_{sd}$. The use of a positive value much lower than 1 as the proportional gain K$_p$ as described above can increase the preceding command value E*$_{sd.max}$(k−1) of the maximum value E$_{sd.max}$ of the isolated system voltage e$_{sd}$ stepwise by repeating the summation, making it possible to adjust the maximum value (amplitude) E$_{sd.max}$ of the output voltage from the inverter 5 (isolated system voltage e$_{sd}$) to gradually match or follow the amplitude of the commercial system voltage e$_{uw}$.

Immediately after the switch S$_{sd}$ is switched from position 1 to position 0, the maximum value (amplitude) E$_{sd.max}$ of the output voltage from the inverter 5 (isolated system voltage e$_{sd}$) and the preceding command value E*$_{sd.max}$(k−1) of the maximum value E$_{sd.max}$ of the isolated system voltage e$_{sd}$ are substantially the same as the command value E*$_{cst}$ of the maximum value E$_{sd.max}$ of the isolated system voltage e$_{sd}$. By using such a method of adjusting the maximum value (amplitude) E$_{sd.max}$ of the output voltage from the inverter 5 to gradually match the amplitude of the commercial system voltage e$_{uw}$ also after the switch S$_{sd}$ is switched from position 1 to position 0, a soft start effect at start-up of the hybrid power generation and storage system 1 can be obtained also after the switch S$_{sd}$ is switched from position 1 to position 0.

The following Equations (1) and (2) are used to calculate the maximum value (amplitude) E$_{sd.max}$ of the isolated system voltage e$_{sd}$ when the switch S$_{sd}$ is in position 0, while the following Equations (3) and (4) are used to calculate it when the switch S$_{sd}$ is in position 1. Further, the following equation (5) is used to calculate the maximum value (amplitude) E$_{uw.max}$ of the commercial system voltage e$_{uw}$. In these Equations, T$_{uw}$ and f$_{uw}$ are the period and frequency of the commercial system voltage e$_{uw}$, respectively, while T$_{sd}$ and f$_{sd}$ are the period and frequency of the isolated system voltage e$_{sd}$, respectively.

$$E_{sd \cdot max} = \sqrt{\frac{4}{T_{uw}} \int_0^{\frac{T_{uw}}{2}} e_{sd}^2(t) dt} \quad (1)$$

$$T_{uw} = \frac{1}{f_{uw}} \quad (2)$$

$$E_{sd \cdot max} = \sqrt{\frac{4}{T_{sd}} \int_0^{\frac{T_{sd}}{2}} e_{sd}^2(t) dt} \quad (3)$$

$$T_{sd} = \frac{1}{f_{sd}} \quad (4)$$

$$E_{uw \cdot max} = \sqrt{\frac{4}{T_{uw}} \int_0^{\frac{T_{uw}}{2}} e_{uw}^2(t) dt} \quad (5)$$

Figure 4A:
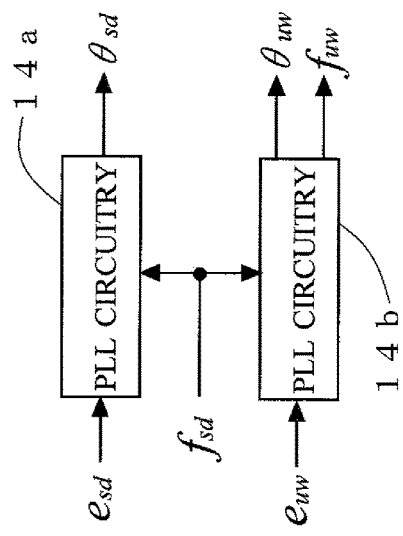

FIG. 4A is a schematic block diagram showing an outline of the PLL circuitry 14 of FIG. 1, which comprises a PLL circuitry 14a configured to obtain a phase angle $\theta_{sd}$ of the isolated system voltage e$_{sd}$ and a PLL circuitry 14b configured to obtain a phase angle $\theta_{uw}$ of the commercial system voltage e$_{uw}$. These phase angles $\theta_{sd}$ and $\theta_{uw}$ are used for the amplitude and phase adjustment control shown in FIG. 3 above. In FIG. 4A, f$_{sd}$ represents the frequency of the isolated system voltage e$_{sd}$.

Figure 4B:
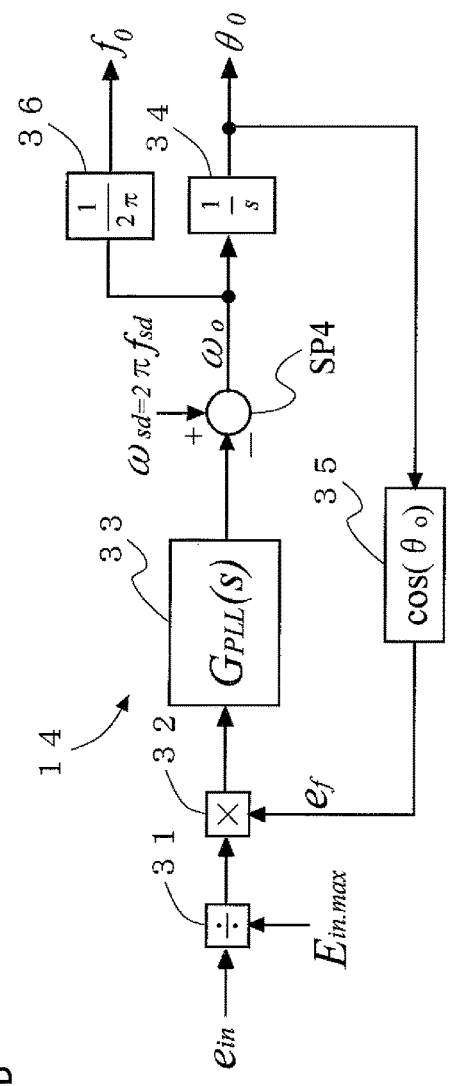
FIG. 4B is a schematic block diagram showing control of the PLL circuitry.

On the other hand, FIG. 4B is a schematic block diagram showing control of the PLL circuitry 14 (PLL circuitry 14a and PLL circuitry 14b). Referring to FIG. 4B, the control block of the PLL circuitry 14a for the isolated system voltage e$_{sd}$ and the PLL circuitry 14b for the commercial system voltage e$_{uw}$ will be described. Note that the PLL circuitry 14a and the PLL circuitry 14b perform similar controls although they receive different kinds of input voltages e$_{in}$. Thus, in describing FIG. 4B, these PLL circuitries 14a and 14b will be described collectively as the PLL circuitry 14. In FIG. 4B, the input voltage e$_{in}$ represents either the commercial system voltage e$_{uw}$ or the isolated system voltage e$_{sd}$. Further, in FIG. 4B, E$_{in.max}$ and $\theta_o$ represent E$_{uw.max}$ and $\theta_{uw}$, respectively, when the input voltage e$_{in}$ is the commercial system voltage e$_{uw}$, while E$_{in.max}$ and $\theta_o$ represent E$_{sd.max}$ and $\theta_{sd}$, respectively, when the input voltage e$_{in}$ is the isolated system voltage e$_{sd}$.

The PLL circuitry 14 comprises a divider 31, a multiplier 32, a loop controller (loop filter) 33, an integrator 34, a feedback signal generator 35 and a frequency calculator 36. Based on an input voltage e$_{in}$ to the PLL circuitry 14 and a maximum value (amplitude) E$_{in.max}$ of the input voltage e$_{in}$ obtained by the control circuitry 7, the divider 31 calculates a sine value sin($\theta_{in}$) of a phase angle $\theta_{in}$ of the input voltage e$_{in}$. The multiplier 32 multiplies this sine value sin($\theta_{in}$) by a feedback signal voltage value cos($\theta_o$) output from the feedback signal generator 35 to output an output value (product of the multiplication), which is input to the loop controller 33 as an input value. Based on this input value, the loop controller 33 outputs an adjustment value proportional to a difference in angular frequency between the input voltage e$_{in}$ and the feedback signal voltage. This adjustment value is subtracted from an angular frequency $\omega_{sd}$ (=2πf$_{sd}$) of the isolated system voltage e$_{sd}$ at a summing point SP4 to obtain an adjusted angular frequency $\omega_o$. The integrator 34 integrates the adjusted angular frequency $\omega_o$ to calculate a phase angle $\theta_o$ of the input voltage e$_{in}$. Further, the frequency calculator 36 calculates an output frequency f$_o$ from the PLL circuitry 14 based on the adjusted angular frequency $\omega_o$.

By using the PLL circuitry 14 as described above, the phase angle $\theta_o$ corresponding to the frequency (isolated system frequency) f$_{sd}$ of the isolated system voltage e$_{sd}$ can be obtained based on the angular frequency $\omega_{sd}$ of the isolated system voltage e$_{sd}$ when the hybrid power generation and storage system 1 performs an isolated operation control after (immediately after) its start-up, even if the amplitude E$_{sd.max}$ of the isolated system voltage e$_{sd}$ has an initial value of 0. Further, even if the fundamental frequency of the PLL circuitry 14 is set to the frequency f$_{sd}$ of the isolated system voltage e$_{sd}$ different from the frequency f$_{uw}$ of the commercial system voltage e$_{uw}$ as described above, the phase angle $\theta_{uw}$ of the commercial system voltage e$_{uw}$ can be obtained without a problem in the grid-connected operation due to the action of the loop controller 33. Even if the frequency f$_{sd}$ of the isolated system voltage e$_{sd}$ is set to 50 Hz, and the frequency f$_{uw}$ of the commercial system voltage e$_{uw}$ is 60 Hz, the phase angle of the output voltage from the inverter 5 at or after (immediately after) start-up of the hybrid power generation and storage system 1 can be maintained at a phase angle ($\theta_{uw}$+Δφ), which deviates from the phase angle $\theta_{uw}$ of the commercial system voltage e$_{uw}$ by an added phase difference Δφ, since the phase angle $\theta_{uw}$ of the commercial system voltage e$_{uw}$ is obtained by the PLL circuitry 14 as described above.

Further, since the method of amplitude and phase adjustment control shown in FIG. 3 is used to adjust the amplitude and phase of the output voltage from the inverter 5 (isolated system voltage $e_{sd}$) when starting the isolated operation control, the hybrid power generation and storage system 1 can be smoothly started up, even if the command value $E^*_{cst}$ of the maximum value $E_{sd.max}$ of the isolated system voltage $e_{sd}$ is different from the maximum value (amplitude) $E_{uw.max}$ of the commercial system voltage $e_{uw}$, or even if the phase angle $\theta_{sd}$ of the isolated system voltage $e_{sd}$ is different from the phase angle $\theta_{uw}$ of the commercial system voltage $e_{uw}$. Here, the phrase "can be smoothly started up" means that an abrupt increase in the maximum value (amplitude) $E_{sd.max}$ of the output voltage from the inverter 5 (isolated system voltage $e_{sd}$) can be avoided at start-up of the hybrid power generation and storage system 1.

For example, even if the effective value and frequency of the commercial system voltage $e_{uw}$ are 200V and 60 Hz, respectively, while the effective value and frequency of the isolated system voltage $e_{sd}$ in normal isolated operation are 100V and 50 Hz, respectively, the hybrid power generation and storage system 1 can be smoothly connected to the commercial power system (grid) 3 without an abrupt increase in the maximum value (amplitude) of the output voltage from the inverter 5, since the method of amplitude and phase adjustment control shown in FIG. 3 is used to perform the isolated operation control after (immediately after) start-up of the hybrid power generation and storage system 1, and thereafter connect the inverter 5 to the commercial power system 3 to start the grid-connected operation.

Next, referring to the flow chart of FIG. 5, a flow of a control process of the hybrid power generation and storage system 1 according to the present exemplary embodiment at its start-up will be described. Before connection to the commercial power system (grid) 3, the control circuitry 7 (mainly the start-up control circuitry 13) of the hybrid power generation and storage system 1 switches each of the switch $S_{GRID}$ and the switch $S_{sd}$ to position 1, and turns off each of the grid connection relays $S_u$, $S_w$ and the isolated power system relay $S_{std}$ to perform an isolated operation control (step S1). Note that the claimed "isolated operation control" means the control performed by the isolated operation control section shown in FIG. 2 with the isolated power system relay $S_{std}$ turned off at start-up of the hybrid power generation and storage system 1.

When a predetermined time from the start of the isolated operation control has elapsed (YES in step S2), and the maximum value (amplitude) of the output voltage from the inverter 5 reaches the command value $E^*_{cst}$ of the maximum value of the isolated system voltage $e_{sd}$, the control circuitry 7 switches the switch $S_{sd}$ to position 0 to perform the amplitude and phase adjustment control shown in FIG. 3, if the hybrid power generation and storage system 1 is set to be connected to the commercial power system 3 (YES in step S3), so as to adjust the amplitude, phase and frequency of the output voltage from the inverter 5 (isolated system voltage $e_{sd}$) to match the amplitude, phase and frequency of the commercial system voltage $e_{uw}$, respectively (step S4). Note here that as to the phase angle at this time in step S4, the phase angle $\theta_{sd}$ of the output voltage from the inverter 5 is switched to the phase angle ($\theta_{uw}+\Delta\varphi$), which has a phase difference $\Delta\varphi$ from the phase angle $\theta_{uw}$ of the commercial system voltage $e_{uw}$.

Figure 5:
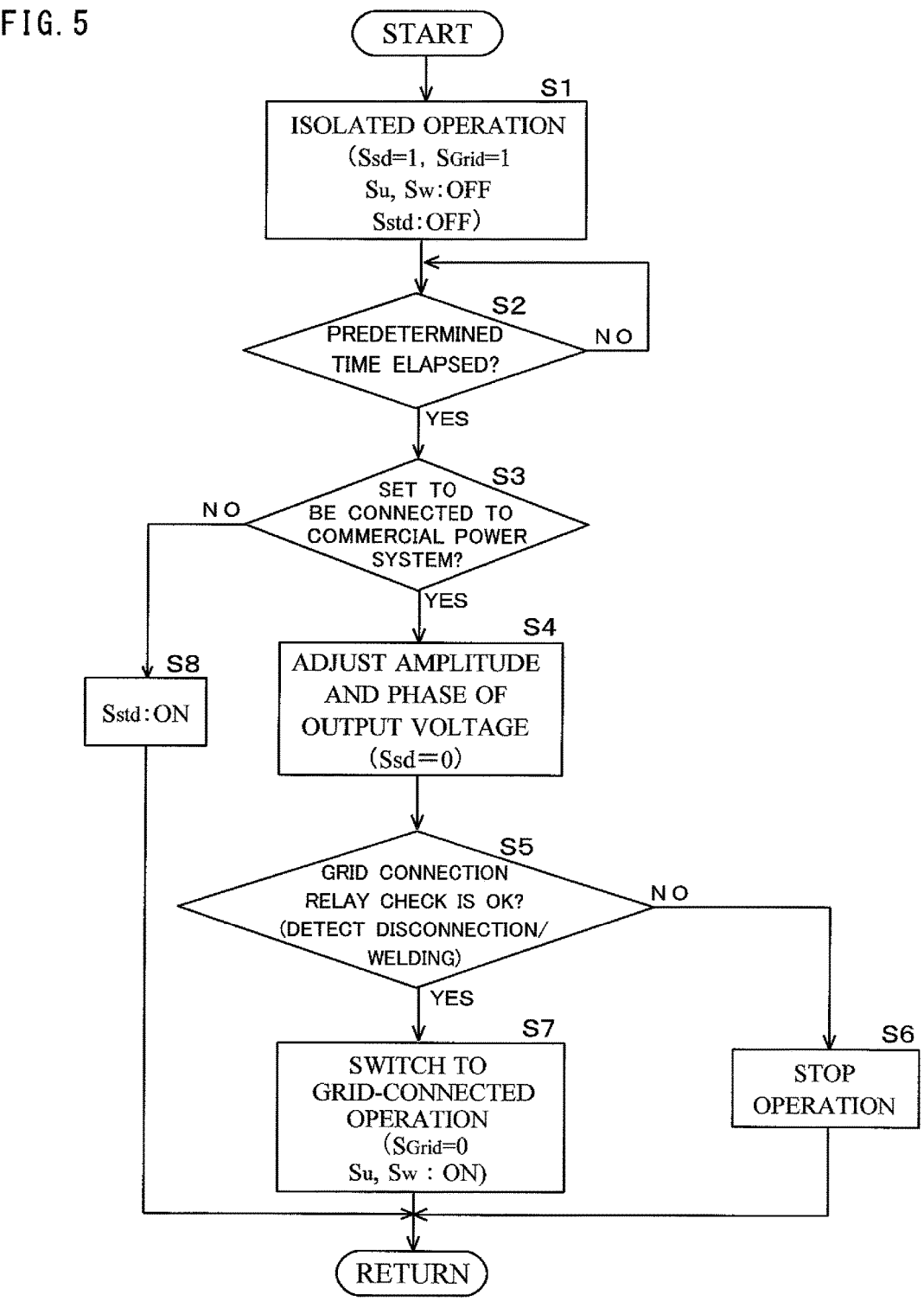
FIG. 5 is a flow chart of a control process of the hybrid power generation and storage system at its start-up.
Figure 6:
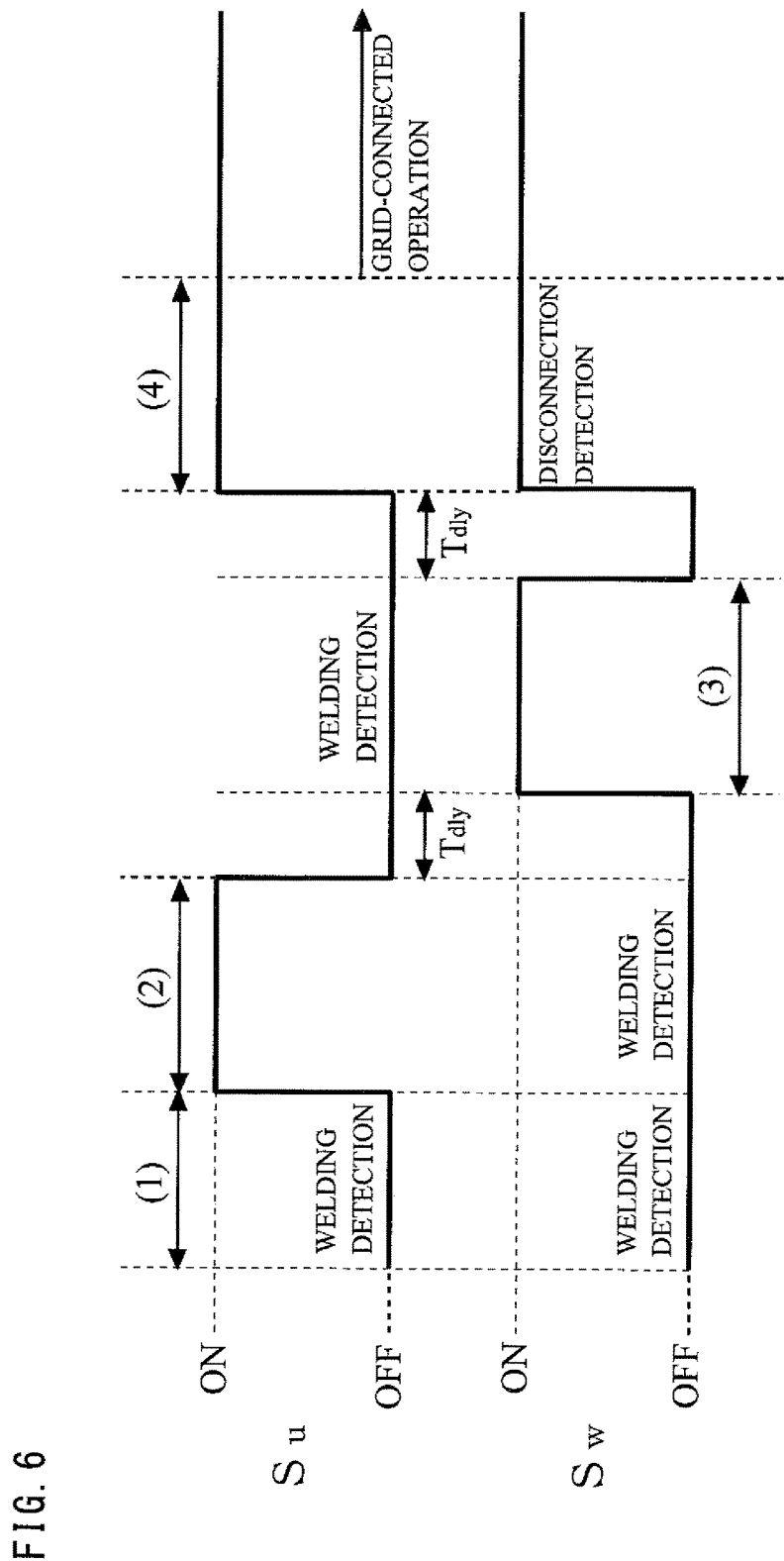
FIG. 6 is a schematic chart showing an on/off switching of grid connection relays of the hybrid power generation and storage system in a disconnection/welding detection process of each grid connection relay.

Subsequently, the control circuitry 7 (mainly the start-up control circuitry 13 and the disconnection/welding detection circuitry 16) of the hybrid power generation and storage system 1 turns the grid connection relays $S_u$, $S_w$ on and off as shown in FIG. 6 below to detect disconnection and welding of the grid connection relays $S_u$ and $S_w$ (step S5 in FIG. 5). This will be described in detail below with reference to FIG. 6, which is a schematic chart showing an on/off switching of the grid connection relays $S_u$, $S_w$ in a disconnection/welding detection process of each of the grid connection relays $S_u$, $S_w$.

Referring to FIG. 6, in period (1), with both grid connection relays $S_u$, $S_w$ turned off, the control circuitry 7 detects whether both grid connection relays $S_u$, $S_w$ are welded. Further, in period (2), with the grid connection relay $S_w$ kept turned off, the control circuitry 7 turns only the grid connection relay $S_u$ on, and detects whether the grid connection relay $S_w$ is welded. Further, in period (3), when a predetermined time $T_{dly}$ elapses from the end of period (2), the control circuitry 7 turns the grid connection relay $S_u$ off and the grid connection relay $S_w$ on, and detects whether the grid connection relay $S_u$ is welded. Furthermore, in period (4), when a predetermined time $T_{dly}$ elapses from the end of period (3), the control circuitry 7 detects, with both grid connection relays $S_u$, $S_w$ turned on, whether the grid connection relay $S_u$ or the grid connection relay $S_w$ is disconnected.

Next, a specific disconnection/welding detection process of the grid connection relays $S_u$, $S_w$ will be described. First, as shown in FIG. 4A, the control circuitry 7 uses a PLL circuitry 14b configured to detect a phase angle of the commercial system voltage $e_{uw}$ to obtain a phase angle $\theta_{uw}$ of the commercial system voltage $e_{uw}$, and also uses a PLL circuitry 14a configured to detect a phase angle of the isolated system voltage $e_{sd}$ to obtain a phase angle $\theta_{sd}$ of the isolated system voltage $e_{sd}$. Then, if, in period (1), (2) or (3) in FIG. 6, a detection value $\Delta x$ of a phase difference (claimed "phase difference as detected") between the phase angle $\theta_{uw}$ of the commercial system voltage $e_{uw}$ and the phase angle $\theta_{sd}$ of the isolated system voltage $e_{sd}$ as shown in the following Equation (6) is equal to or less than a certain threshold (here $k1 \cdot \Delta\varphi$ where k1 is a proportional constant) as shown in the following Equation (7), the control circuitry 7 determines that welding occurs in the grid connection relay $S_u$ and/or the grid connection relay $S_w$ (NO in step S5 in FIG. 5), and stops the operation of the hybrid power generation and storage system 1 (step S6 in FIG. 5).

$$|\theta_{uw} - \theta_{sd}| = \Delta x \quad (6)$$

$$\Delta x \leq k1 \cdot \Delta\varphi \quad (7)$$

Further, if, in period (4) in FIG. 6, the detection value $\Delta x$ in the above Equation (6) is equal to or more than a certain threshold (here $k2 \cdot \Delta\varphi$ where k2 is a proportional constant) as shown in the following Equation (8), the control circuitry 7 determines that disconnection occurs in at least one of the grid connection relay $S_u$ and the grid connection relay $S_w$ (NO in step S5 in FIG. 5), and stops the operation of the hybrid power generation and storage system 1 (step S6 in FIG. 5).

$$\Delta x \geq k2 \cdot \Delta\varphi \quad (8)$$

A summary of the disconnection/welding detection process described above is that before starting the grid-connected operation, the control circuitry 7 (its disconnection/welding detection circuitry 16) detects disconnection of the grid connection relays $S_u$, $S_w$ based on a detection value $\Delta x$ of the phase difference (that is, phase difference as detected) between the phase angle $\theta_{uw}$ of the commercial system voltage $e_{uw}$ detected by the PLL circuitry 14b and the phase angle $\theta_{sd}$ of the isolated system voltage $e_{sd}$ detected by the PLL circuitry 14a, when turning the grid connection relays $S_u$, $S_w$ on (that is, when switching the grid connection switch to a connected state), and also detects welding of the grid connection relays $S_u$, $S_w$ based on the detection value $\Delta x$ of the phase difference as detected which is detected by the PLL circuitry 14b and the PLL circuitry 14a, when turning the grid connection relays $S_u$, $S_w$ off (that is, when switching the grid connection switch to a disconnected state). Note here that a power conversion device to detect welding of an isolated power system relay is described in Japanese Laid-open Patent Publication 2014-064415 as discussed in the Description of the Related Art. However, although the power conversion device described in Japanese Laid-open Patent Publication 2014-064415 can detect welding of the isolated power system relay, it cannot detect disconnection of the isolated power system relay.

If, in the disconnection/welding detection process of step S5, the control circuitry 7 does not detect welding or disconnection of the grid connection relays $S_u$, $S_w$ (YES in step S5), the control circuitry 7 (mainly the start-up control circuitry 13) switches the switch $S_{Grid}$ to position 0 and turns the grid connection relays $S_u$, $S_w$ on to switch from the isolated operation to the grid-connected operation (step S7), and performs the grid-connected operation control in the grid-connected operation control section shown in the upper part of FIG. 2. If, in the determination process of step S3, the hybrid power generation and storage system 1 is set to be disconnected from the commercial power system 3 (NO in step S3), the control circuitry 7 turns the isolated power system relay $S_{std}$ on (step S8) to start the isolated operation.

The start-up control method for the hybrid power generation and storage system 1 according to the present exemplary embodiment described above has four features. The first feature is to allow the hybrid power generation and storage system 1 to perform an isolated operation control before connecting itself to the commercial power system 3. If the hybrid power generation and storage system 1 is connected, immediately after its start-up, to the commercial power system 3, the commercial system voltage $e_{uw}$ is suddenly applied to the capacitor $C_f$ to cause an abrupt increase in the applied voltage to the capacitor $C_f$, and therefore, an inrush current may flow in the capacitor $C_f$. In contrast, according to the present exemplary embodiment, before connecting itself to the commercial power system 3, the hybrid power generation and storage system 1 sets the switch $S_{sd}$ in position 1 to perform an isolated operation control with a soft start as described above with reference to FIG. 3, which allows the applied voltage to the capacitor $C_f$ to increase gradually. Therefore, it is possible to eliminate the possibility that an inrush current may flow in the capacitor $C_f$ when the hybrid power generation and storage system 1 is connected to the commercial power system 3.

The second feature is to use a feedback control to adjust the amplitude of the output voltage from the inverter 5 (amplitude of the isolated system voltage $e_{sd}$) to gradually match the amplitude of the commercial system voltage $e_{uw}$, with the switch $S_{sd}$ set in position 0 as shown in FIG. 3 before connecting the hybrid power generation and storage system 1 to the commercial power system 3. The third feature is to check a failure (detect disconnection/welding) of the grid connection relays $S_u$, $S_w$ before allowing the hybrid power generation and storage system 1 to shift to grid-connected operation control. The fourth feature is to allow the hybrid power generation and storage system 1 to smoothly shift from the isolated operation control to the grid-connected operation control. Here, the reason for the smooth shift is (1) because of the second feature to allow the hybrid power generation and storage system 1 to shift to the grid-connected operation control after adjusting the amplitude of the output voltage from the inverter 5 (amplitude of the isolated system voltage $e_{sd}$) to match the amplitude of the commercial system voltage $e_{uw}$ be, and (2) because of the third feature to allow the hybrid power generation and storage system 1 to start the grid-connected operation after determining the absence of a failure (disconnection/welding) in the grid connection relays $S_u$, $S_w$.

According to the hybrid power generation and storage system 1 of the present exemplary embodiment, the use of the start-up control method described above can prevent or reduce an inrush current to the capacitor $C_f$ provided between the inverter 5 and the commercial power system 3 at start-up of the hybrid power generation and storage system 1 without using a conventional inrush current prevention circuitry. In addition, it is possible to reliably detect disconnection and welding of the grid connection relays $S_u$, $S_w$ before the hybrid power generation and storage system 1 is connected to the commercial power system 3.

In order to confirm the effect of the start-up control method described above, an experiment at start-up of the hybrid power generation and storage system 1 was conducted with the grid connection relay $S_w$ welded. Note that in normal operation, if the grid connection relay $S_w$ is welded, the operation of the hybrid power generation and storage system 1 is stopped and prevented from shifting to the grid connected operation as shown in the flow chart of FIG. 5. However, in this experiment, after welding of the grid connection relay $S_w$ was detected, the operation of the hybrid power generation and storage system 1 was intentionally shifted to the grid-connected operation, and then the occurrence of inrush current to the capacitor $C_f$ when using the start-up control method was checked. In short, the purpose of this experiment at start-up of the hybrid power generation and storage system 1 is to determine, in the same experiment, the effect of reducing inrush current to the capacitor $C_f$ and the effect of checking disconnection/welding of the grid connection relays $S_u$, $S_w$ when using the start-up control method described above.

Figure 7:
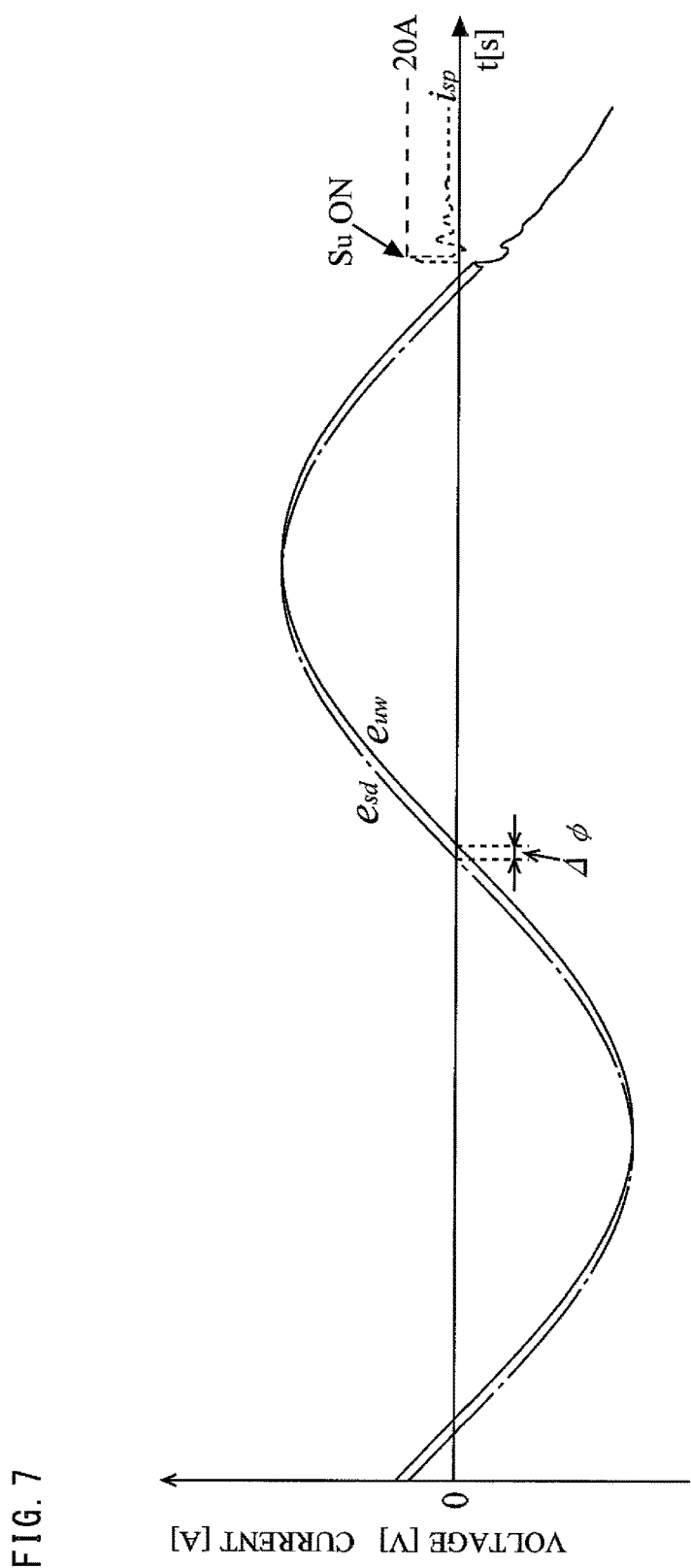
FIG. 7 is a graph showing results of an experiment conducted at start-up of the hybrid power generation and storage system with one of the grid connection relays welded.

FIG. 7 is a graph showing results of this experiment conducted at start-up of the hybrid power generation and storage system 1 with the grid connection relay $S_w$ welded. FIG. 7 shows an output voltage from the inverter 5 (isolated system voltage $e_{sd}$) and a commercial system voltage $e_{uw}$ in the hybrid power generation and storage system 1 using the start-up control method described immediately before it is connected to the commercial power system 3, and also shows the occurrence of inrush current to the capacitor $C_f$ when it is switched from the isolated operation to the grid connected operation. In FIG. 7, the one-dot chain curve shows the output voltage $e_{sd}$ from the inverter 5, and the solid curve shows the commercial system voltage $e_{uw}$, while the dashed curve shows a reverse power flow current $i_{sp}$. Note that in FIG. 7, the vertical axis represents voltage (V) and current (A), while the horizontal axis represents time t (sec).

According to this experiment, as shown in FIG. 7, the reverse power flow current $i_{sp}$ became a spike-like inrush current at the moment when the grid connection relays $S_u$, $S_w$ were turned on. Here, the reason for the generation of the spike-like inrush current is because of a phase difference $\Delta\varphi$ (set to 200 μs in this experiment which corresponds to about 4.32°) given between the isolated system voltage $e_{sd}$ and the commercial system voltage $e_{uw}$ (when the switch $S_{sd}$ is in position 0). Thus, at the moment when the grid connection relays $S_u$, $S_w$ are turned on, a difference between the commercial system voltage $e_{uw}$ and an AC voltage applied to the capacitor $C_f$, which is due to the phase difference $\Delta\varphi$ between the isolated system voltage $e_{sd}$ and the commercial system voltage $e_{uw}$, causes a current to flow in the capacitor $C_f$, consequently causing an instantaneous inrush current. Note here that since the phase difference $\Delta\varphi$ is set to a small value as described above, the instantaneous inrush current which is generated has a value of up to 20 A. This level of generated instantaneous inrush current does not exceed a maximum allowable current of the switching elements SW1 to SW4 of the inverter 5, and therefore, the entire hybrid power generation and storage system 1 including the inverter 5 operates normally in spite of the inrush current. In addition, in the experiment, welding of the grid connection relay $S_w$ could be detected.

As a result of the experiment, it could be confirmed that it was possible to reduce an inrush current to the capacitor $C_f$ by using the method of amplitude and phase adjustment control shown in FIG. 3 to adjust the amplitude and phase of the output voltage from the inverter 5. In addition, it could be confirmed that it was possible to detect welding of the grid connection relay by using the disconnection/welding detection process of the grid connection relay.

As described above, according to the hybrid power generation and storage system 1 of the present exemplary embodiment, the amplitude of the output voltage from the inverter 5 (isolated system voltage $e_{sd}$) is increased stepwise from a given value (or more specifically, an amplitude of an isolated system voltage $e_{sd}$ output from the hybrid power generation and storage system 1 in the isolated operation), after the start-up of the hybrid power generation and storage system 1, to adjust the amplitude of the output voltage from the inverter 5 to match the amplitude of the detected commercial system voltage $e_{uw}$, and thereafter the inverter 5 is connected to the commercial power system 3 to start the grid-connected operation of the hybrid power generation and storage system 1. Thus, the voltage applied to the capacitor $C_f$ provided between the inverter 5 and the commercial power system 3 can be prevented from abruptly increasing from 0V to the commercial system voltage $e_{uw}$ at start-up of the hybrid power generation and storage system 1. This makes it possible to reduce an inrush current to the capacitor $C_f$ provided between the inverter 5 and the commercial power system 3 at start-up of the hybrid power generation and storage system 1 without using an inrush current prevention circuitry.

Further, according to the hybrid power generation and storage system 1 of the present exemplary embodiment, the control circuitry 7 (its start-up control circuitry 13) controls to connect the inverter 5 to the commercial power system 3 to start the grid-connected operation after the phase angle adjustment circuitry 15 adjusts the phase angle $\theta_{sd}$ of the output voltage from the inverter 5 (isolated system voltage $e_{sd}$) after start-up of the hybrid power generation and storage system 1 to allow a phase difference between the output voltage from the inverter 5 and the commercial system voltage $e_{uw}$ to have a certain value. Thus, the inverter 5 can be connected to the commercial power system 3 to start the grid-connected operation, after not only the amplitude but also the phase angle of the output voltage from the inverter 5 (isolated system voltage $e_{sd}$) is adjusted by using the phase angle of the commercial system voltage $e_{uw}$. This makes it possible to further reduce the change in the voltage applied to the capacitor $C_f$ provided between the inverter 5 and the commercial power system 3 when the hybrid power generation and storage system 1 is connected to the commercial power system 3, and therefore, the inrush current to the capacitor $C_f$ can be further reduced.

Further, according to the hybrid power generation and storage system 1 of the present exemplary embodiment, before it starts the grid-connected operation, it detects disconnection of the grid connection relays $S_u$, $S_w$ based on the detection value $\Delta x$ of the phase difference between the output voltage from the inverter 5 (isolated system voltage $e_{sd}$) and the commercial system voltage $e_{uw}$ as detected by the PLL circuitry 14$a$ and the PLL circuitry 14$b$, respectively, when turning the grid connection relays $S_u$, $S_w$ on (connected state), and also detects welding of the grid connection relays $S_u$, $S_w$ based on the detection value $\Delta x$ of the above phase difference as detected by the PLL circuitry 14$a$ and the PLL circuitry 14$b$, respectively, when turning the grid connection relays $S_u$, $S_w$ off (disconnected state). Thus, disconnection and welding of the grid connection relays $S_u$ and $S_w$ can be detected before starting the grid-connected operation of the hybrid power generation and storage system 1.

MODIFIED EXAMPLES

It is to be noted that the present invention is not limited to the above-described exemplary embodiment, and various modifications are possible within the spirit and scope of the present invention. Modified examples of the present invention will be described below.

Modified Example 1

FIG. 8 is a flow chart of a control process of the hybrid power generation and storage system 1 according to Modified Example 1 of the present invention at its start-up, which does not use step S1 shown in FIG. 5. According to the above-described exemplary embodiment, in the amplitude and phase adjustment control of the output voltage from the inverter 5 (isolated system voltage $e_{sd}$) shown in FIG. 3, which is performed in the isolated operation control (step S1) shown in FIG. 5 after start-up of the hybrid power generation and storage system 1, the switch $S_{sd}$ is set in position 1, and the maximum value (amplitude) $E_{sd.max}$ of the isolated system voltage $e_{sd}$ is adjusted to match the command value $E^*_{cst}$ of the maximum value $E_{sd.max}$ of the isolated system voltage $e_{sd}$, and thereafter, the switch $S_{sd}$ is switched to position 0 to adjust the maximum value $E_{sd.max}$ (amplitude) of the isolated system voltage $e_{sd}$ to match the maximum value $E_{uw.max}$ (amplitude) of the commercial system voltage $e_{uw}$.

However, as shown in FIG. 8, it is also possible to set the switch $S_{sd}$ in position 0 immediately after start-up of the hybrid power generation and storage system 1 and gradually increase the maximum value $E_{sd.max}$ (amplitude) of the isolated system voltage $e_{sd}$ from 0 to match the maximum value $E_{uw.max}$ (amplitude) of the commercial system voltage $e_{uw}$ (step S11 in FIG. 8) without performing the isolated operation control process (step S1) in the start-up control process as shown in FIG. 5. In this case, in the amplitude and phase adjustment control shown in FIG. 3, both the initial value of the maximum value $E_{sd.max}$ of the isolated system voltage $e_{sd}$ and the initial value of the preceding command value $E^*_{sd.max}(k-1)$ of the maximum value $E_{sd.max}$ of the isolated system voltage $e_{sd}$ are set to 0 (when the switch $S_{sd}$ is set in position 0). When the control process shown in FIG. 8 is performed, a soft start effect at start-up of the hybrid power generation and storage system 1 can be obtained similarly as in the control process shown in FIG. 5. Note that steps S12, S13 and S14 in FIG. 8 correspond to steps S5, S6 and S7 in FIG. 5, respectively.

Modified Example 2

According to the above-described exemplary embodiment, in order to detect disconnection and welding of the grid connection relays $S_u$, $S_w$, the control circuitry 7 adjusts the phase angle of the output voltage from the inverter 5 (isolated system voltage $e_{sd}$) after (immediately after) start-up of the hybrid power generation and storage system 1 to allow the phase difference between the phase angle of the output voltage from the inverter 5 (isolated system voltage $e_{sd}$) and the phase angle of the commercial system voltage $e_{uw}$ detected by the PLL circuitry 14 to have a certain value ($\Delta\varphi$). However, as Modified Example 2, the control circuitry 7 can be designed to allow the start-up control circuitry 13 to control the hybrid power generation and storage system 1 so that after the phase angle adjustment circuitry 15 adjusts the phase angle of the output voltage from the inverter 5, after (immediately after) the start-up of the hybrid power generation and storage system 1, so as to allow the above-described phase difference to have a value within a predetermined range, the start-up control circuitry 13 connects the inverter 5 to the commercial power system to start the grid-connected operation. This configuration can also reduce an inrush current to the capacitor forming the LC filter.

Modified Example 3

The above-described exemplary embodiment shows an example where the claimed "capacitor" is the capacitor $C_f$ forming the LC filter 6. However, the claimed "capacitor" is not limited thereto, and can be any capacitor connected between the inverter and the commercial power system (that is, any capacitor on the output side of the inverter).

Modified Example 4

The above-described exemplary embodiment shows an example where the grid connection power conversion device of the present invention is a hybrid power generation and storage system 1 formed by a combination of a solar photovoltaic power generation system and a power storage device. However, the grid connection power conversion device having an isolated operation function to which the present invention is applied is not limited thereto, and can be any other kind of hybrid power generation and storage system comprising a combination of a DC/DC converter for various distributed power supplies such as a wind power generation system with a bidirectional DC/DC converter for various power storage devices. Further, the grid connection power conversion device having an isolated operation function to which the present invention is applied is not necessarily limited to those comprising a distributed power supply and a power storage device, and can be a configuration to form a hybrid power generation and storage system by being connected to a distributed power supply and a power storage device which are externally mounted.

Modified Example 5

The above-described exemplary embodiment shows an example where the control circuitry 7 is formed by a so-called microcomputer. However, the control circuitry 7 is not limited thereto, and can be formed by, for example, a system LSI (Large-Scale Integrated circuit).

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:

1. A grid connection power conversion device which is provided for connecting a distributed power supply, whose output power is stored in a power storage device, to a commercial power system, the grid connection power conversion device comprising:
   an inverter for converting DC power based on power input from at least one of the distributed power supply and the power storage device to AC power;
   a grid connection switch for switching the connection of the distributed power supply to the commercial power system between a connected state and a disconnected state;
   a commercial voltage phase angle detection circuitry configured to detect a phase angle of a commercial system voltage which is a voltage of the commercial power system;
   an output voltage phase angle detection circuitry configured to detect a phase angle of an output voltage from the inverter; and
   a disconnection/welding detection circuitry configured to detect disconnection of the grid connection switch, before starting grid-connected operation, based on a phase difference as detected between the phase angle detected by the output voltage phase angle detection circuitry and the phase angle detected by the commercial voltage phase angle detection circuitry when switching the grid connection switch to the connected state, and also configured to detect welding of the grid connection switch, before starting the grid-connected operation, based on the phase difference as detected when switching the grid connection switch to the disconnected state.

2. The grid connection power conversion device according to claim 1, further comprising:
   a capacitor connected between the inverter and the commercial power system;
   a commercial voltage amplitude detection circuitry configured to detect an amplitude of the commercial system voltage;
   an amplitude adjustment circuitry configured to increase an amplitude of the output voltage from the inverter stepwise from a given value to adjust the amplitude of the output voltage from the inverter to match the amplitude of the commercial system voltage detected by the commercial voltage amplitude detection circuitry; and
   a start-up control circuitry configured to control the grid connection power conversion device so that after the amplitude adjustment circuitry adjusts the amplitude of the output voltage from the inverter, after start-up of the grid connection power conversion device, to match the amplitude of the commercial system voltage detected by the commercial voltage amplitude detection circuitry, the start-up control circuitry connects the inverter to the commercial power system to start the grid-connected operation.

3. The grid connection power conversion device according to claim 2, further comprising:
   a phase angle adjustment circuitry configured to adjust the phase angle of the output voltage from the inverter to allow a phase difference between the phase angle of the output voltage from the inverter and the phase angle of the commercial system voltage detected by the commercial voltage phase angle detection circuitry to have a value within a predetermined range, wherein the start-up control circuitry controls the grid connection power conversion device so that after the phase angle adjustment circuitry adjusts the phase angle of the output voltage from the inverter, after the start-up of the grid connection power conversion device, so as to allow the phase difference to have a value within a predetermined range, the start-up control circuitry connects the inverter to the commercial power system to start the grid-connected operation.

4. The grid connection power conversion device according to claim 2, wherein the start-up control circuitry performs an isolated operation control immediately after the start-up of the grid connection power conversion device, and wherein in the isolated operation control, the amplitude adjustment circuitry adjusts the amplitude of the output voltage from the inverter to match the amplitude of the commercial system voltage detected by the commercial voltage amplitude detection circuitry.

5. The grid connection power conversion device according to claim 2, wherein the amplitude adjustment circuitry increases the amplitude of the output voltage from the inverter stepwise from an isolated system voltage output from the grid connection power conversion device in an isolated operation or from 0 to adjust the amplitude of the output voltage from the inverter to match the amplitude of the commercial system voltage detected by the commercial voltage amplitude detection circuitry.

6. The grid connection power conversion device according to claim 1, wherein each of the commercial voltage phase angle detection circuitry and the output voltage phase angle detection circuitry is a PLL circuitry.

7. A disconnection/welding detection method for a grid connection power conversion device which is provided for connecting a distributed power supply, whose output power is stored in a power storage device, to a commercial power system, and which comprises: an inverter for converting DC power based on power input from at least one of the distributed power supply and the power storage device to AC power; and a grid connection switch for switching the connection of the distributed power supply to the commercial power system between a connected state and a disconnected state, the disconnection/welding detection method comprising the steps of:

detecting a phase angle of an output voltage from the inverter, and a phase angle of a commercial system voltage which is a voltage of the commercial power system, before starting grid-connected operation, when switching the grid connection switch to the disconnected state;

detecting welding of the grid connection switch, before starting the grid-connected operation, based on a phase difference as detected between the phase angle of the output voltage from the inverter and the phase angle of the commercial system voltage, when switching the grid connection switch to the disconnected state;

detecting the phase angle of the output voltage from the inverter, and the phase angle of the commercial system voltage, before starting grid-connected operation, when switching the grid connection switch to the connected state; and detecting disconnection of the grid connection switch, before starting grid-connected operation, based on the phase difference as detected between the phase angle of the output voltage from the inverter and the phase angle of the commercial system voltage, when switching the grid connection switch to the connected state.

* * * * *